(12) United States Patent
Ratzlaff et al.

(10) Patent No.: US 10,244,737 B2
(45) Date of Patent: *Apr. 2, 2019

(54) MODULAR FORCE SENSOR SYSTEM, DEVICE, AND METHOD FOR BEHAVIORAL MEASUREMENT

(71) Applicant: UNIVERSITY OF KANSAS, Lawrence, KS (US)

(72) Inventors: Kenneth L. Ratzlaff, Lawrence, KS (US); Robert W. Young, Lawrence, KS (US); George R. Fullen, Jr., Littleton, CO (US); Stephen C. Fowler, Lawrence, KS (US)

(73) Assignee: University of Kansas, Lawrence, KS (US)

( * ) Notice: Subject to any disclaimer, the term of this patent is extended or adjusted under 35 U.S.C. 154(b) by 105 days.

This patent is subject to a terminal disclaimer.

(21) Appl. No.: 15/223,629

(22) Filed: Jul. 29, 2016

(65) Prior Publication Data

US 2017/0049079 A1 Feb. 23, 2017

Related U.S. Application Data

(63) Continuation of application No. 13/468,302, filed on May 10, 2012, now Pat. No. 9,408,372.

(60) Provisional application No. 61/484,780, filed on May 11, 2011, provisional application No. 61/488,261, filed on May 20, 2011.

(51) Int. Cl.
*A01K 29/00* (2006.01)
*G01L 5/00* (2006.01)

(52) U.S. Cl.
CPC .......... *A01K 29/005* (2013.01); *G01L 5/0038* (2013.01)

(58) Field of Classification Search
CPC .............................. A01K 29/005; G01L 5/0038
USPC ............................................. 702/139, 41, 42
See application file for complete search history.

(56) References Cited

U.S. PATENT DOCUMENTS

| 6,601,010 | B1 | 7/2003 | Fowler et al. |
| 8,633,721 | B1 | 1/2014 | Ames |
| 9,408,372 | B2 | 8/2016 | Ratzlaff et al. |
| 2003/0028327 | A1* | 2/2003 | Brunner .................. A01K 1/031 702/19 |
| 2009/0044761 | A1* | 2/2009 | Chapin .................. A01K 1/031 119/720 |
| 2011/0213439 | A1* | 9/2011 | Kokones ............ A61N 1/36103 607/45 |
| 2011/0227872 | A1 | 9/2011 | Huska et al. |

(Continued)

OTHER PUBLICATIONS

U.S. Appl. No. 61/484,780, filed May 11, 2011, Ratzlaff et al.

(Continued)

*Primary Examiner* — Eman A Alkafawi
(74) *Attorney, Agent, or Firm* — Ray Quinney & Nebeker P.C.; Paul N. Taylor

(57) ABSTRACT

Implementations of the present invention relate to for analyzing behavior of small live test subjects. More specifically, methods and devices of the present invention can allow a researcher to use a single device for analyzing effects of genetic modifications made to the test subjects on the test subject's behavior and movements. Additionally, the methods and devices may allow for analysis of effects that various medications may have on the test subject's behavior and movement.

31 Claims, 9 Drawing Sheets

(56) References Cited

U.S. PATENT DOCUMENTS

2012/0253233 A1* 10/2012 Greene ................ A61B 5/1117
600/592

OTHER PUBLICATIONS

U.S. Appl. No. 61/488,261, filed May 20, 2011, Ratzlaff et al.
U.S. Appl. No. 13/468,302, Nov. 25, 2014, Office Action.
U.S. Appl. No. 13/468,302, Jul. 30, 2015, Office Action.
U.S. Appl. No. 13/468,302, Dec. 11, 2015, Office Action.
U.S. Appl. No. 13/468,302, Mar. 28, 2016, Notice of Allowance.

* cited by examiner

MODULAR FORCE SENSOR SYSTEM, DEVICE, AND METHOD FOR BEHAVIORAL MEASUREMENT

CROSS-REFERENCE TO RELATED APPLICATIONS

The present application is a continuation of U.S. application Ser. No. 13/468,302, filed May 10, 2012, which claims the benefit or priority to: U.S. Provisional Application No. 61/484,780, entitled "High-Resolution Limb Force Tracker," filed on May 11, 2011 and U.S. Provisional Patent Application No. 61/488,261, entitled "High-Resolution Limb Force Tracker," filed on May 20, 2011, the entireties of which are incorporated by this reference.

STATEMENT REGARDING FEDERALLY SPONSORED RESEARCH

This invention was made with government support under Grant #HD002528 awarded by the National Institutes of Health. The government has certain rights in this invention.

BACKGROUND OF THE INVENTION

1. The Field of the Invention

This invention relates to systems, methods, and apparatus for determining various behavioral aspects of a test subject on a surface.

2. Background and Relevant Art

Genetically manipulated mice play a useful role in studying genetic composition and responsiveness of mammalian genes and gene sequences. In the context of neuroscience, behavioral assessments can be made by ascertaining how the genetic manipulations affect brain function as well as whether proposed experimental therapies have any (beneficial or detrimental) effects. For instance, genetically altered mice (knockout, transgenic, etc.) that exhibit disease symptoms have been developed for studying Huntington's disease, Parkinson's disease, Amyotrophic Lateral Sclerosis, and globoid cell leukodystrophy.

Thus, oftentimes, a neuroscientist may use a mouse as a test subject; the mouse may be relatively small (e.g., 25 g in body weight). Additionally, the mouse may exhibit a richness of behavior that may require a multivariate approach to quantify various behavioral functions, such as locomotion, grooming, rearing up, jumping, exploratory behavior, circling, learning and memory (maze learning, object recognition), and presence of abnormalities such as tremor or ataxia. Thus, multiple tests may be needed to fully characterize mouse genetic models of human genetic diseases.

Particularly, ability to determine various aspects of movement of a mammalian test subject on a surface may provide information that may be useful for studying behavioral characteristics of the test subject. For instance, neuroscientist may use test subjects such as genetically manipulated mice (e.g., knockout or knock-in mice) to evaluate behavioral outcomes of genetic modifications. Hence, behavioral outcomes related to particular genetic modification the test subject may inform the researcher about genes or gene sequence roles in the development and/or phenotypes of the test subjects.

Typically, researchers have a variety of motor behavior assessment tools, such as the rotarod, photobeam actometers, video trackers, etc. Existing typical assessment tools, however, have various limitations. For instance, the rotarod may require constraining the behavior expressed by the mouse, and thus, can limit the behaviors observed by the scientist; photobeam actometers lack spatial resolution; video tracking methods are limited by the frame rates, spatial resolution, and lighting conditions. Accordingly, current behavioral measurement methods have limitations tracking movement and/or assessing behavior of test subjects.

BRIEF SUMMARY OF THE INVENTION

Implementations of the present invention provide systems, methods, and apparatus for analyzing behavior of small, live test subjects. More specifically, methods and devices of the present invention may allow a researcher to use a single device for analyzing effects of genetic or other modifications made to the test subjects on the test subject's behavior and movements. Additionally, the methods and devices may allow the research to analyze effects various medications have on the test subject's behavior and movements. Particularly, in at least one embodiment, the researcher can track movements of the test subject and may correlate deviations from a control set or pattern of movements with modifications made within the test subject (i.e., genetic or chemical modifications).

At least one embodiment includes a device for measuring the behavior of a test subject having a first weight, which can have a high resolution force module having a first surface. The first surface of the high resolution force module can at least partially include a plurality of force sensors each capable of sensing forces less than a first amount of force, each force sensor of the plurality of force sensors positioned within a predetermined distance from any adjacent force sensor of the plurality of force sensors. The device for measuring behavioral aspects also can include a control system in functional communication with the high resolution force module, the control system comprising a processor and physical memory. The control system can contain instructions that when executed by the processor, cause the control system to perform the following acts: receiving one or more signals from the plurality of force sensors at a predetermined but adjustable rate; and determining behavior of said test subject with respect to the first surface of the high resolution force module.

One or more embodiments include a method of measuring behavior of a test subject having a first weight. The method can include placing said test subject on, and confining it to, a surface of a high resolution force module. The surface of the high resolution force module can have a plurality of force sensors capable of sensing forces less than a first amount of force, wherein each force sensor of the plurality of force sensors is positioned within a predetermined distance from any adjacent force sensor of the plurality of force sensors. The method also can include receiving signals from the plurality of force sensors and processing the received signals from the plurality of force sensors to determine behavior of said test subject with respect to the first surface of the high resolution force module.

Some embodiments also include a method of performing a behavioral assessment of a test subject having multiple legs. The method can include administering a first behavioral assessment of said test subject, which may include placing said test subject on a surface of a high resolution force module. Example behavioral assessments may include observing wall rears, vertical leaps, low speed locomotion, high speed locomotion (including trotting in mice and galloping in rats). Moreover, the researcher can observe rhythmic coordination among feet during walking and trotting.

The surface of the high resolution force module can have a plurality of force sensors capable of sensing forces less than a first amount of force. Each force sensor of the plurality of force sensors may be positioned within a predetermined distance from any adjacent force sensor of the plurality of force sensors. Additionally, the method can include obtaining force and location information from the plurality of force sensors and measure the behavior of the test subject by processing the obtained force and location information.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. For better understanding, the like elements have been designated by like reference numbers throughout the various accompanying figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1A:
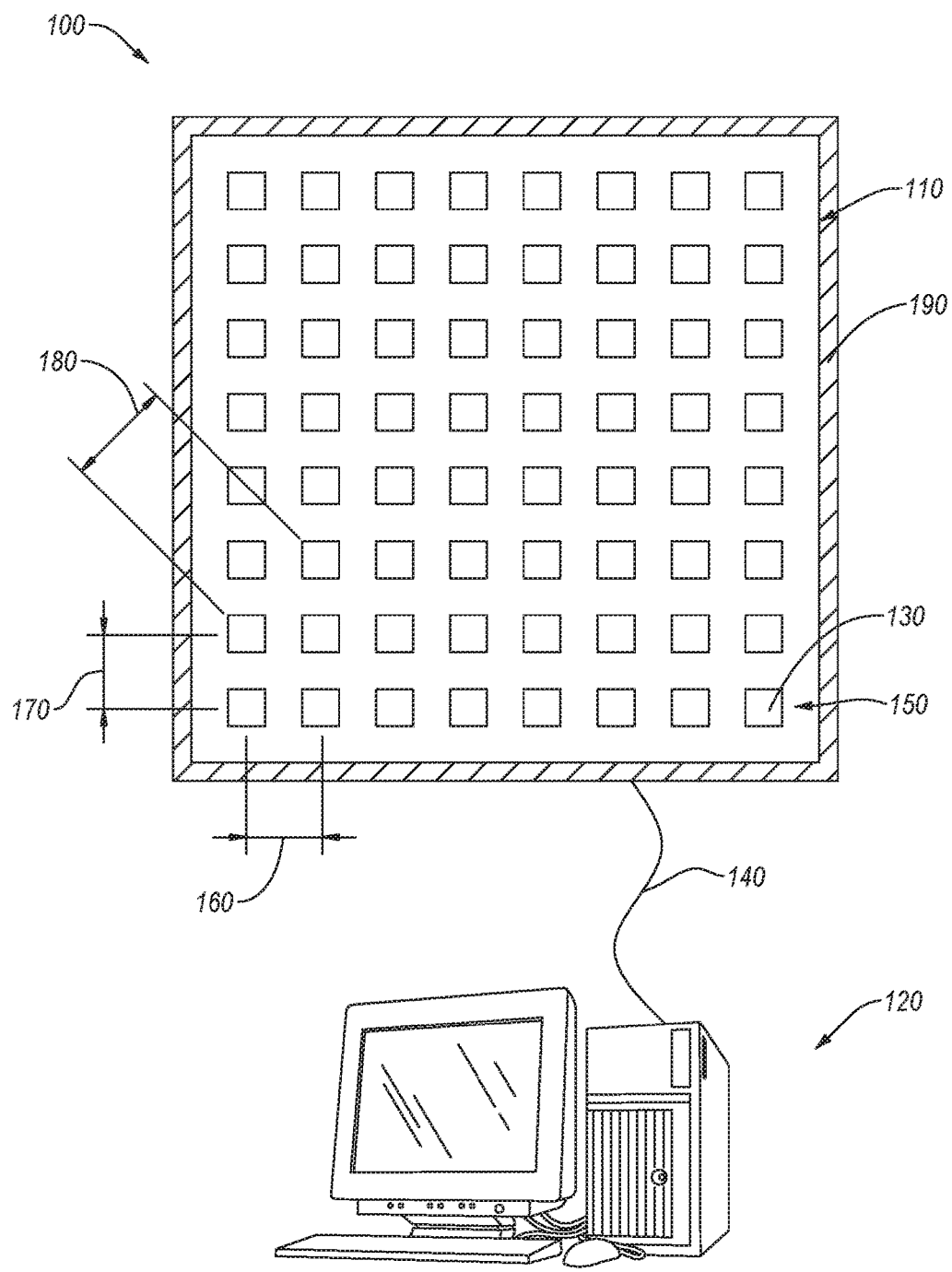
FIG. 1A illustrates a schematic diagram of a device for measuring behavioral aspects of a test subject in accordance with one implementation of the present invention.

Implementations of the present invention provide systems, methods, and apparatus for analyzing behavior of small live test subjects. More specifically, methods and devices of the present invention may allow a researcher to use a single device for analyzing effects of genetic modifications made to the test subjects on the test subject's behavior. Additionally, embodiments of the methods and devices may allow the research to analyze effects that various medications may have on the test subject's behavior. Particularly, in at least one embodiment, the research can track the behavior of the test subject and may correlate deviations from a control set or pattern of behavior with the modifications made to the test subject (i.e., genetic or chemical modifications).

Behavior may include the position, attitude, acceleration, velocity, or other aspects of the test subject. For instance, observable behavior may include scratching, shaking or tremors (including tremors (including individual foot tremors)), number of long, fast, straight runs in a fixed time period, number of periods of relative immobility in a recording session, distance traveled in a recording session. In particular, the above-described motor behaviors can be useful in evaluating spinal cord injuries in test subjects (e.g., in rodents) and for assessing affects of therapies on such injuries. Additionally, the test subject may exhibit behaviors such as repetitive movements (or portions thereof). For instance, test subjects may show tendencies to turn in one direction in a stereotyped fashion (e.g., turning almost always to the right). Further behavioral aspects that may be exhibited by the test subject include time spent near a wall or near the center of an enclosure (defining a testing area).

Also, a researcher can evaluate social behavior of the test subjects. For instance, the researcher may suspend another subject within the test area occupied by the test subject. Alternatively, the researcher can introduce another test subject into the test area (where the second the test subject may be a control test subject). Thus, the research can consider the amount of time one test subject spend next to another test subject or next to the suspended subject.

One or more embodiments may include a high resolution force module and a controller, which may comprise a device for measuring behavioral aspects of the test subject. In particular, the high resolution force module may include a plurality of force sensors that may detect and quantify force as well as the location(s) of the force on a surface of the high resolution force module. For instance, the force sensors may be positioned on or incorporated into the surface of the high resolution force module. Accordingly, as the test subject applies pressure to the surface of the high resolution force module, whether the test subject is standing, lying down, or moving on the surface, the force sensors may detect position as well as the force applied by the test subject (for example by each of the test subject's feet or its body) to the surface of the high resolution force module.

Furthermore, the device for measuring behavioral aspects of the test subject may allow the researcher to obtain information about effects of genetic, chemical, and/or other modifications (or treatments) made to the test subject. More specifically, the device for measuring behavioral aspects of the test subject may allow the researcher to correlate the test subject's motor behavior with the particular modifications made the test subject. For example, the researcher may use the device for measuring behavioral aspects of the test subject such as measuring changes in the test subject's motor behavior, which may occur in response to modifications made to the test subject.

The research may use various test subjects to conduct the experiments. For example, test subjects can include mice, rats, guinea pigs, Madagascar roaches, small terrestrial lizards, pigeons, doves, quail, shrews, voles. Body weights of such test subjects may range from a few grams (e.g., 20-day old mouse) to 500 gram rats.

Accordingly, in one or more embodiments, the device for measuring behavioral aspects of the test subject may include an array of force sensors, which may provide the researcher with information about the test subject's motor behavior. For example, as illustrated in FIG. 1A, a device 100 for measuring behavioral aspects can include a high resolution force module 110 and a controller 120. In particular, the high resolution force module 110 can include multiple force sensors 130. The force sensors 130 can include one or more leads 140, which may independently or collectively functionally connect to the controller 120. Hence, the controller 120 can receive signals from the sensors 130, which may be related to forces applied thereto, as further described below.

The controller 120 can be a general or a special purpose computer, which can include a processor and one or more physical non-transitory computer readable medium having computer executable instructions stored thereon. When executed by the processor, the stored instructions can cause the controller 120 to perform various acts or steps as described herein, including receiving and processing signals from force sensors. In one or more embodiments, several portions or component of the controller 120 as Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers or computer systems comprising the controller 120.

The force sensors 130 may have a predetermined distance one from another such that the high resolution force module 110 has a determined number of force sensors 130 in a certain area (i.e., a force sensor per area resolution of the high resolution force module 110). For instance, the high resolution force module 110 can have a relatively high resolution, such that the force sensors 130 located on the surface of the high resolution force module 110 may be separated one from another by a distance (measured between the centers of the force sensors 130) in the range of approximately 1 mm to 2 mm. Additionally, the distance separating the force sensors 130 one from another also may be in the range of 1.5 mm to 5 mm.

The appropriate minimal distance between the force sensors 130 may be determined based on the size of the test subject's foot, the weight of the test subject, the distance between the feet, other considerations, or combinations thereof. However, it will be understood that the closer the force sensors 130 are to one another, the more sensitive each force sensor 130 must be. For example, if the center to center distance approaches zero, the sensitivity of the force sensors 130 must also approach zero, as the density of the force sensors 130 will reduce the amount of force that each force sensor 130 will measure, respectively. In one example, the distance between adjacent force sensors 130 may be less than the size of the test subject's foot, such that placement of the test subject's foot onto the surface of the high resolution force module 110 may apply pressure to at least one force sensor 130.

Additionally or alternatively, the force sensors 130 may be disposed in one or more rows 150. As described above, the distance between center points of the force sensors 130 may be sufficiently small, such that placement of the test subject's foot onto the surface of the high resolution force module 110 may apply pressure to at least one force sensor 130. Hence, a distance 160 between adjacent force sensors 130 within the row 150 may be in one or more of the ranges described above. Similarly, a distance 170 between adjacent rows 150 also may be in one or more of the ranges described above. The rows 150 may be substantially parallel one to another or may be disposed at other angles with respect to each other. Furthermore, the rows 150 may have a nonlinear configuration, although providing the sensors 130 in a linear configuration greatly reduces the processing power required to determine the location of the applied forces. It should be noted, that a distance 180 between adjacent force sensors 130 located in adjacent rows 150 also may be in the range described above. Moreover, as described above, the force sensors 130 can have other arrangements on the high resolution force module 110.

In some embodiments, the device 100 for measuring behavioral aspects also can include an enclosure 190, which can restrict the test subject's movement. In particular, the enclosure 190 may prevent the test subject from leaving the high resolution force module 110. Accordingly, the researcher may place the test subject on the high resolution force module 110 and can allow the test subject to move thereon without restricting or impeding the test subject's movement (within the enclosure 190).

Some prior art observation devices may require that the test subject remain within a small area (for example, a treadmill, a narrow hallway, or other small area). Certain behaviors of the test subject may be unobservable in such a small area. Unrestricted movement of the test subject can permit observations of more if not most behaviors that may be exhibited by the test subject. In particular, the test subject may exhibit various spontaneous behaviors, which may be related to and/or indicative of modifications (i.e. genetic and/or chemical) of the test subject.

Additionally, an increased test area (e.g., 40 cm×40 cm for a lab mouse) can allow for observation of various behaviors that is not otherwise observable. Moreover, in a larger area, the test subject is more likely to adopt a "home position," following repeated experiments (e.g., 20 minutes per day, for 5 days).

Additionally or alternatively, the high resolution force modules 110 can comprise a flexible polyimide stack, which can include the force sensors 130 and a rigid support module placed below the flexible polyimide stack for support. For example, the force sensors 130 may be arranged in a single layer (i.e. at substantially the same vertical distance) between a polyimide upper layer and a polyimide lower layer of the high resolution force module 110. The rigid support module provides a reference point for determining the force applied to each sensor 130.

In some embodiments, the force sensors 130 can be pre-stressed, which can reduce the noise received by the controller 120 from the force sensors 130 and can produce more accurate and/or consistent readings from the force sensors 130. For instance, the rigid support module can have one or more vacuum ports on a surface upon which the flexible polyimide stack can lie. Hence, a vacuum can be pulled through the vacuum ports to direct the upper polyimide layer toward the surface of the rigid support module thereby pre-stressing the force sensors 130. The known force applied by the vacuum (or any other pre-stressor) can be used to find the basis for the force sensors 130.

Figure 1B:
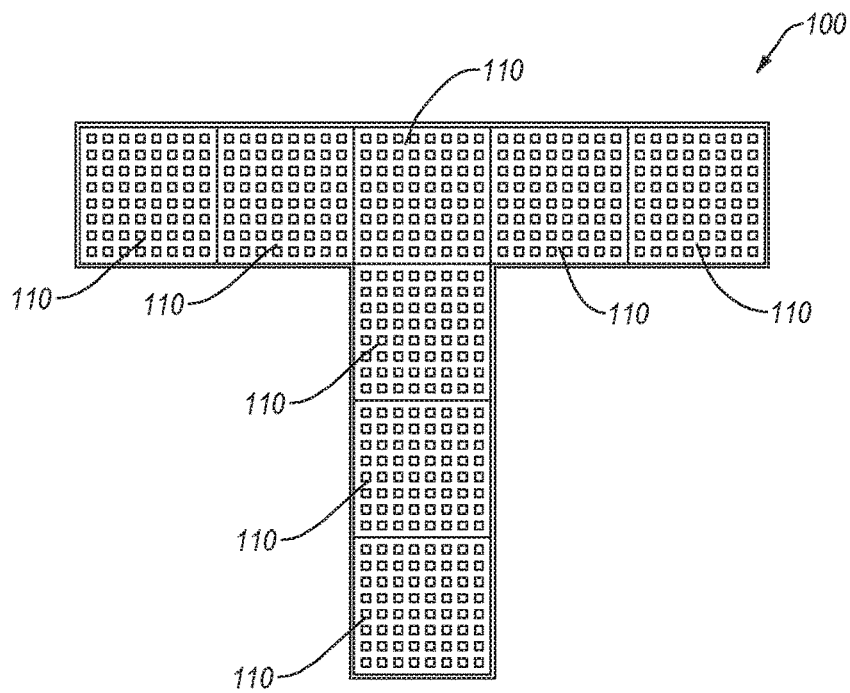
FIG. 1B illustrates a schematic diagram of a device for measuring behavioral aspects of a test subject in accordance with another implementation of the present invention.

Furthermore, the device 100 for measuring behavioral aspects can include multiple high resolution force modules 110, which can be positioned in various arrangements. For example, as illustrated in FIG. 1B, the device 100 can incorporate multiple high resolution force modules 110, which can form a T-shaped stage (or test area). Such a test area may allow the researcher to elicit certain behaviors that may be associated with the particular configuration of the test area. Additionally, similar to combining multiple high resolution force modules 110, areas having various shapes can be combined into a single test area (e.g., concatenated T-shapes or T mazes).

Figure 1C:
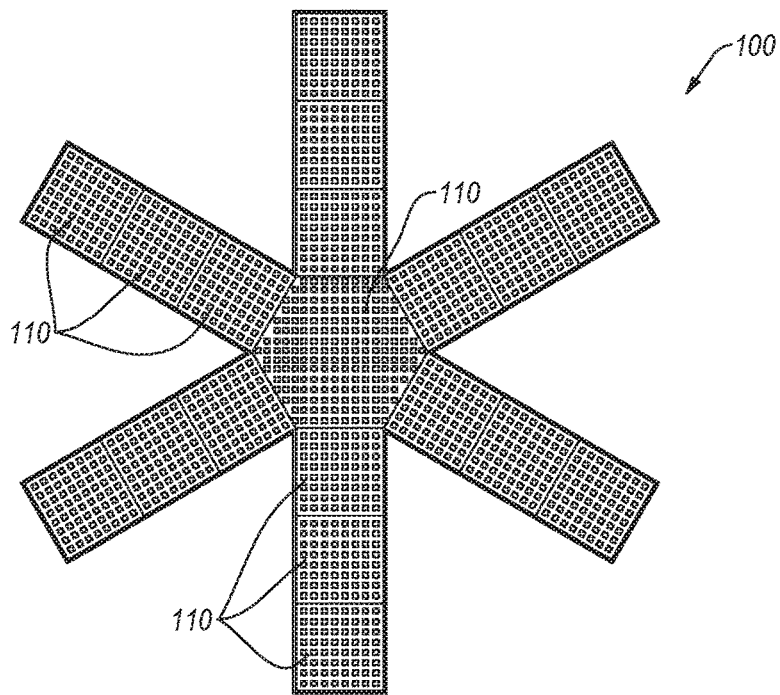
FIG. 1C illustrates a schematic diagram of a device for measuring behavioral aspects of a test subject in accordance with yet another implementation of the present invention.

Moreover, the researcher may easily disassemble the T-shaped test area and assemble test areas having other configurations. For instance, as illustrated in FIG. 1C, the researcher can combine the high resolution force modules 110 to form a radial maze. The radial maze also can allow the researcher to elicit particular types of behavior from the test subject, which may be associated with the shape of this test area. It should be noted, however, that the high resolution force modules 110 may be combined in any number of way to form a desired shape and configuration of the test area.

For example, the high resolution force modules 110 can form a substantially rectangular arena within which the test subject can move freely (i.e., for a 12 cm by 12 cm force module 110, the arena could be a two-module by three-module rectangle—a 24 cm by 36 cm area). Additionally or alternatively, the high resolution force modules 110 can form a T-shaped stage, a runway, as well as various other shapes and configurations, which can form a test area within which the test subject can move freely. Accordingly, the researcher can choose an appropriate arrangement of the high resolution force modules 110 as maybe desired for a particular experiment and/or to elicit a desired behavior or set of behaviors. Moreover, the researcher can reposition the high resolution force modules 110 and can form different arrangements within which the test subject and move freely. Adding modules provides the ability to create a larger observation area without sacrificing resolution It should be noted that each high resolution force module 110 can have a predetermined density (or resolution) of force sensors thereon, as described above. Accordingly, the predetermined device resolution can be fixed as the same as the individual resolution of each of the high resolution force modules 110 throughout the entire area on within which the test subject may travel. In other words, additional modules of high resolution force modules 110 that comprise the device 100 for measuring behavioral aspects would not degrade the overall resolution of the device 100 for measuring behavioral aspects. Thus, unlike video methods, where resolution may degrade with increase in the area being covered, the device 100 for measuring behavioral aspects can maintain the same accuracy irrespective of the overall size or shape of the stage or arena used in the experiment.

Furthermore, modular construction of the device 100 for measuring behavioral aspects (i.e., incorporating multiple high resolution force modules 110) can facilitate a desired sampling rate (further described below). More specifically, the controller 120 can comprise multiple processors and/or computers, which can receive and/or process signals from multiple high resolution force modules 110 in parallel. Hence, the high resolution force modules 110 can have a desired size and can contain a desired and predetermined number of force sensors 130, such that each processor and/or computer comprising the controller 120 has sufficient processing capacity to receive and process the signals from the force sensors 130 located on each of the high resolution force modules 110. Accordingly, the device 100 for measuring behavioral aspects can be scaled to a desired size, without being limited by processing capacity of a particular single processor or computer that comprises the controller 120.

Figure 2:
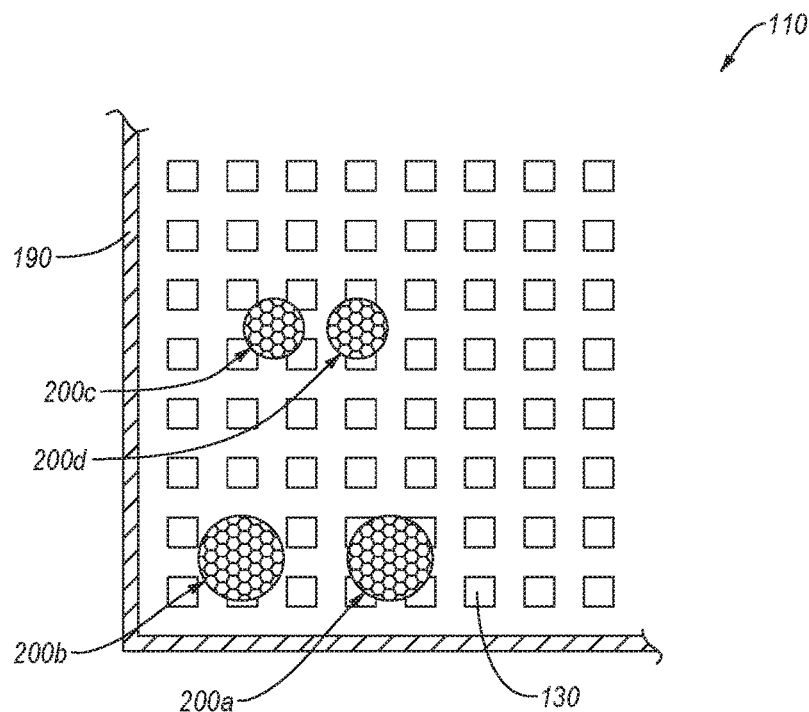
FIG. 2 illustrates a schematic diagram of a high resolution force module of the device for measuring behavioral aspects of a test subject with a test subject's feet thereon in accordance with one implementation of the present invention.

In some embodiments, the researcher may place the test subject onto the at least one high resolution force module 110 such that the test subject is free to move about, and the researcher can monitor the behavior of the test subject. For example, as illustrated in FIG. 2, the researcher may use a test subject that has feet 200a, 200b, 200c, 200d. Although, some embodiments are discussed herein with respect to feet, it will be appreciated that other body parts (i.e. tails, torso, or other body parts) may come into contact with the device 100. As described above, the test subject may have feet 200a, 200b, 200c, 200d that are sufficiently large that they may apply pressure at least one force sensor 130 on the high resolution force module 110. For instance, the foot 200a may apply pressure to two force sensors 130. Similarly, the foot 200b may apply pressure to four force sensors 130. More or fewer force sensors 130 may be contacted depending on the size of the test subject, the size of the force sensors 130, the distance between force sensors 130, other factors, or combinations thereof.

Figure 3:
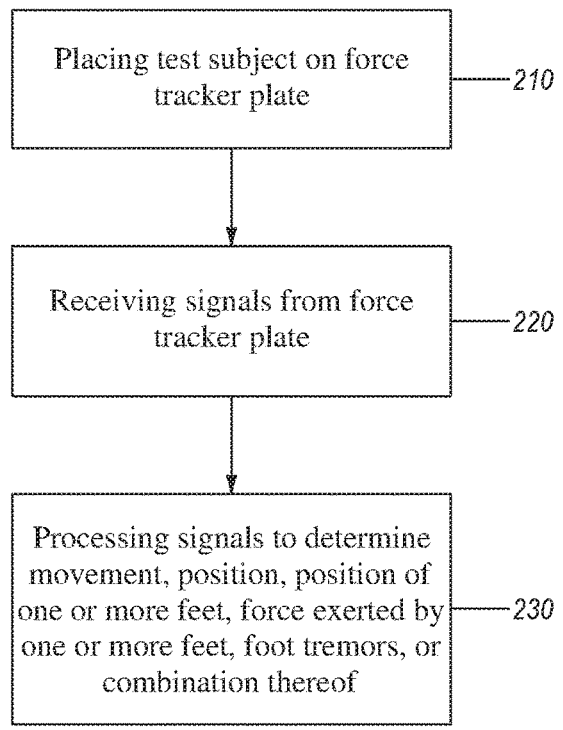
FIG. 3 illustrates a flowchart for performing a behavioral assessment in accordance with one implementation of the present invention.

Accordingly, as shown in FIG. 3, the researcher may perform a behavioral assessment of the test subject, by placing the test subject on the high resolution force module 110 (step 210). Subsequently, the researcher, via the controller 120 (FIG. 1) can receive signals from the high resolution force module 110 (step 220). The controller and/or the researcher can use and/or can further process the received signals, as further described below, to determine behavior of the test subject (step 230). Behavior may include movement, position, position of one or more feet, force exerted by one or more feet, tremors (including individual foot tremors), or combination thereof for the particular test subject. The behavior determined during the behavioral assessment of the test subject also may include distance traveled, velocity of runs, bouts of low mobility, rotations, focused stereotypy, grooming, jumping (including force produced during takeoff and landing and duration of the jump), and combinations thereof within the same recording session.

In addition to performing behavioral assessment that may correlate various behaviors of the test subject with one or more modifications made thereto, the behavioral assessment also can be used to correlate the test subject's behavior with brain activity of the test subject. For example, one or more chronic electrodes can be implanted into the test subject's brain at one end and connected to a head stage at another end. Subsequently, readings from the chronic electrodes can be obtained from the head stage during a behavioral assessment of the test subject. Hence, such readings from the head stage can be correlated with the test subject's movement, gait, position, position of one or more feet, force exerted by one or more feet, tremors (including individual foot tremors), velocity, bouts of low mobility, rotations, focused stereotypy, or a combination thereof. Furthermore, the readings can include information about firings of neurons in the test subject's brain during the behavioral assessment thereof. Thus, the neuron activity in the subject's brain can be correlated with the test subject's movement, gait, position, position of one or more feet, force exerted by one or more feet, tremors (including individual foot tremors), velocity, bouts of low mobility, rotations, focused stereotypy, or a combination thereof.

Figure 4A:
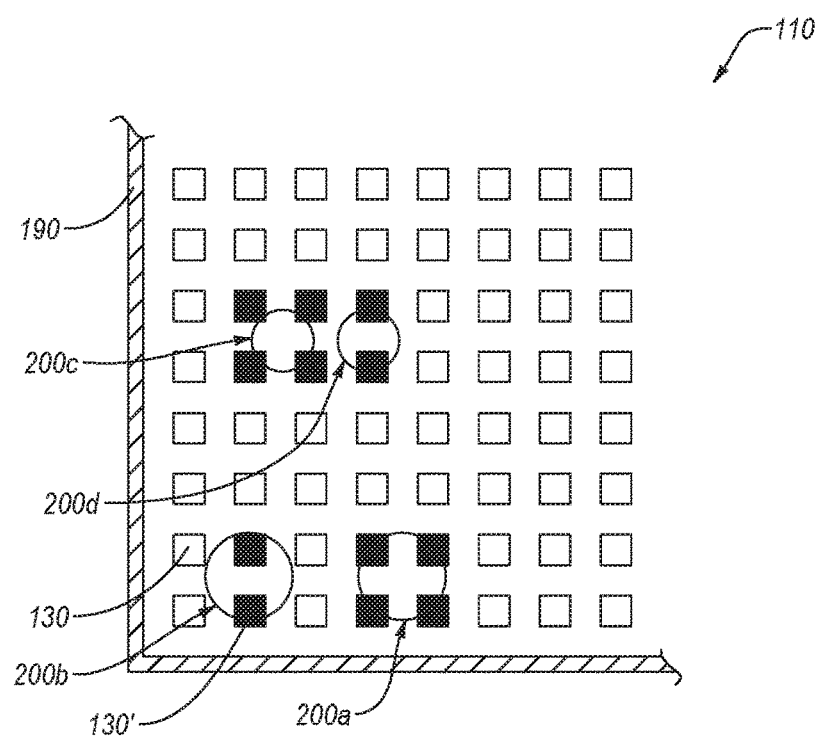
FIG. 4A illustrates a schematic diagram of a high resolution force module with force sensors activated by a test subject's feet in a first position in accordance with one implementation of the present invention.

Thus as described above, as the test subject moves on the surface of the high resolution force module 110, the number of the force sensors 130 to which each of the test subject's feet 200a, 200b, 200c, 200d applies pressure may change, as further discussed below (FIG. 2). By applying pressure onto the force sensors 130, as illustrated in FIG. 4A, the test subject can activate the force sensors 130; such activated force sensors 130' can send corresponding signals to the controller 120 (FIG. 1). Furthermore, the signals received by the controller from the activated force sensors 130' can provide information about the amount of force applied to such activated force sensors 130'.

For instance, force sensors 130 may be resistive force sensors, which may be biased by a predetermined voltage. Hence, as the test subjects step's or other contact with the force sensors 130, the force applied by the test subject's foot (or other body part) may deform the force sensor 130, thereby activating force sensor 130 (i.e., forming the activated force sensor 130'). More specifically, deformation of the resistive force sensor 130 can change the resistance of the force sensor 130, which may be detected by the controller. Furthermore, the controller may be calibrated, such that to associate a change in the resistance of the force sensors 130 with the force applied thereto.

In some embodiments, the controller may have information about locations of the force sensors 130. Particularly, the controller may associate the leads 140 (FIG. 1) with particular locations of the force sensors 130 on the high resolution force module 110. For example, the location may be expressed as a relative location of the force sensors 130 on the high resolution force module 110, one with respect to another. Additionally or alternatively, the controller may associate locations of the force sensors 130 with the perimeter of the high resolution force module 110 and/or with the enclosure 190.

More specifically, each force sensor 130 can represent a sensel, which may be a point in a two-dimensional space of the high resolution force modules 110, similar to a pixel on a display. The controller can process signals from related to sensel locations, as provided by the active force sensors 130', to generate a visual representation of the test subject's movement on the high resolution force modules 110.

It should be noted that the device 100 for measuring behavioral aspects can create the visual representation of the test subject's movement irrespective of environmental parameters, such as lighting. Hence, various experiments can be performed in diminished lighting or without any lighting. Such experiments can reduce the number of variables in the experiment (e.g., lighting conditions, color of the test subject, etc.), which may inadvertently affect and/or interfere therewith. Additionally, the researcher may be able to elicit certain types of behavior that may not be exhibited in other lighting conditions.

Particularly, the controller may determine the position of the test subject's feet 200a, 200b, 200c, 200d based on the locations of the activated force sensors 130'. As described above, each of the test subject's feet 200a, 200b, 200c, 200d may activate one or more force sensors 130. More specifically, each of the feet 200a, 200b, 200c, 200d, may activate a number of force sensors 130 (which may be a fixed number or may fall within a predetermined range), based on the size of the foot, size of the force sensors 130, and the distance between the force sensors 130. For instance, any one of the test subject's feet 200a, 200b, 200c, 200d, in this example, can cover and (therefore) apply pressure to 1-4 force sensors 130 located on the high resolution force module 110.

Moreover, a particular test subject can have a predetermined distance between its feet 200a, 200b, 200c, 200d. For example, the distance between the test subject's feet can be sufficiently large, in comparison with the resolution of the high resolution force module 110, such that each foot activates an independent group of force sensors 130. Moreover, each independent group of activated force sensors 130' may be separated from all other independent groups of activated force sensors 130'. In other words, when the test subject stands or moves on the high resolution force module 110, the test subject's feet 200a, 200b, 200c, 200d activate discrete groups of force sensors 130, which can be distinguished one from another.

Figure 4B:
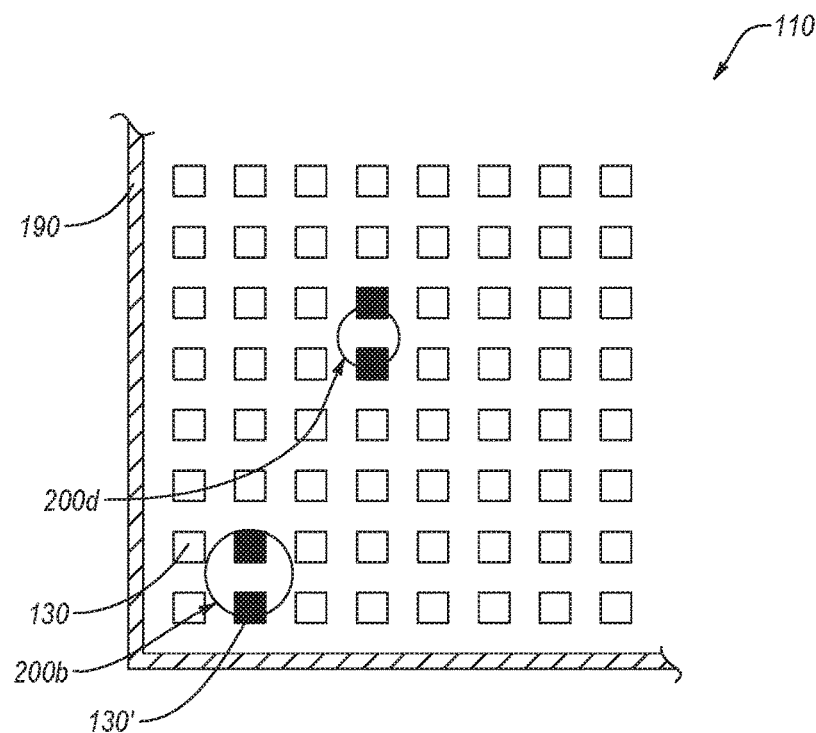
FIG. 4B illustrates a schematic diagram of the high resolution force module of FIG. 4A with force sensors activated by a test subject's feet in a second position.

Accordingly, when the test subject moves on the high resolution force module 110, the device 100 for measuring behavioral aspects can detect and analyze such movement. For example, as illustrated in FIG. 4B, if a standing test subject that has four feet 200a, 200b, 200c, 200d (FIG. 4A), commences movement by lifting two of its feet off the surface of the high resolution force module 110, the controller can detect commencement of such movement, as the previously activated force sensors 130' will no longer be activated. Thus, the controller can detect such deactivation and correlate it with movement of the test subject.

Figure 4C:
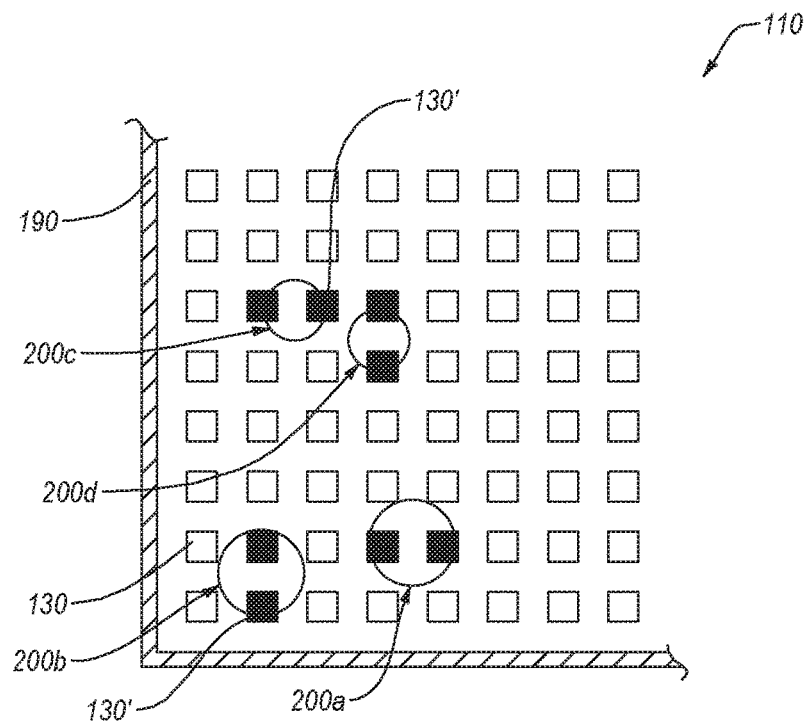
FIG. 4C illustrates a schematic diagram of the high resolution force module of FIG. 4A with force sensors activated by a test subject's feet in a third position.

Similarly, as illustrated in FIG. 4C, the test subject that is moving on the high resolution force module 110 may activate different groups of force sensors 130, by placing its feet back onto the surface of the high resolution force module 110. More specifically, after the test subject lifts one or more its feet off the surface of the high resolution force module 110 (FIG. 4B), as the test subject moves forward and places the previously lifted feet back onto the surface of the high resolution force module 110, the activated force sensors 130' (or groups thereof) send a signal to the controller. Hence, the controller can determine the new position of the test subject's feet (and the center of the test subject) as well as forces applied by the test subject's feet at the various positions.

As further described below, the device 100 for measuring behavioral aspects can determine various types of movement of the test subject on the high resolution force module 110.

Figure 4D:
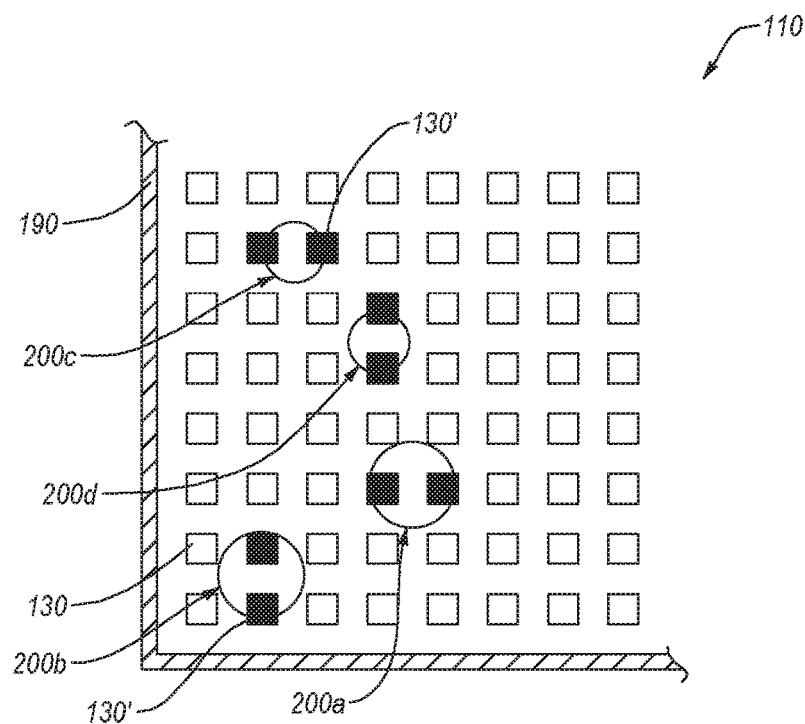
FIG. 4D illustrates a schematic diagram of the high resolution force tracker module of FIG. 4A with force sensors activated by a test subject's feet in a fourth position.

For instance, as illustrated in FIG. 4D, test subject's gait (i.e., pattern of movement of the test subject's legs) can change depending on the type of movement. Particularly, the distance between previously activated force sensors 130' and subsequently activated sensors 130', as the test subject lifts (FIG. 4B) and replants its feet on the high resolution force module 110 (FIG. 4D) may increase with the test subject's speed of travel increase. Furthermore, time between lifting off and replanting of the test subject's feet on the high resolution force module 110 can increase with increased speed of travel. Accordingly, the device 100 for measuring behavioral aspects can determine both the gait of the test subject as well as the speed of travel of the test subject on the high resolution force module 110.

Additionally or alternatively, the controller can process signals from the active force sensors 130' to identify particular feet (and legs) of the test subject. For example, a mouse has different sized hind and front feet. Moreover, spacing between different sets (i.e., front and back) of the test subject's feet can be used to identify each foot of the test subject. Accordingly, by identifying the front and hind feet and legs of the test subject, such as a mouse, the direction of the test subject's movement can be determined.

Additionally, the device 100 for measuring behavioral aspects can detect other features of the test subject's movements, as described above and further described below. In particular, the device 100 for measuring behavioral aspects can detect direction of movement, position, position of one or more feet, force exerted by one or more feet, vibrations (i.e. tremors (including individual foot tremors)), distance traveled, velocity, bouts of low mobility, rotations, focused stereotypy, as well as other behavioral aspects described above, and combinations thereof. Thus, in some embodiments, the various behavioral aspects of the test subject can be analyzed by monitoring the movement of the test subject on the high resolution force module 110. Detecting such movement however may require force sensors 130 capable of detecting a force that is equal to or less than a minimum force applied by the test subject's foot or a portion of the test subject's foot onto the surface of the high resolution force module 110.

Commonly used test subjects may have a weight of less than 5 kg. A typical laboratory mouse may have a weight in the range of 5 g to 50 g (with a typical mouse weighing about 25 g). Moreover, the test subject may have an even or uneven weight distribution between its legs. For example, a test subject that has four legs may have more weight distributed onto its hind legs. Furthermore, in some instances, the test subject may not place entire weight on one or more of the legs (e.g., the test subject may limp and/or drag one of its legs as in the formalin pain assay), thereby may apply a further reduced amount of force on to the high resolution force module 110. Accordingly, to detect various behavioral aspects of the test subject, the force sensors may require sensitivity sufficient to detect (or sense) such reduced force (i.e., the force sensors 130 may sense forces less than the force applied by the test subject's feet). For instance, the force sensors 130 may have a sensitivity in one or more of the following ranges: approximately 0.5 g to 1.5 g (at standard gravitational pull); 1 g to 5 g; 2 g to 10 g; and 5 g to 20 g. The force sensors 130 also may have sensitivities below 0.5 g. Moreover, in some instances, the test subjects can apply forces, which may exceed their body weight, onto the force sensors 130 (e.g., during jumps). Accordingly, the force sensors 130 can have force sensitivity that has an upper bound in the range of 50 g to 200 g, 100 g to 500 g, and 500 g to 1 kg.

As described above, the researcher can use the device for measuring behavioral aspects to conduct behavioral assessments of test subjects. In one or more embodiments, the test subject may be genetically and/or chemically modified. For instance, the test subject may have altered DNA as compared with a control test subject. Additionally or alternatively, the test subject may be medicated (e.g., to inflict or reduce pain, to counteract certain medical conditions, etc.). Thus, the researcher can compare the modified test subject to a control test subject. Moreover, in the case where genetic and/or chemical modification of the test subject may result in changing behavior over time, periodic behavioral assessments of the test subject can be performed, by periodically (e.g., once an hour, a day, a week, a month, etc.) placing the test subject on the high resolution force module 110 (FIG. 2), to monitor changes in the test subject's behavioral aspects.

Figure 5A:
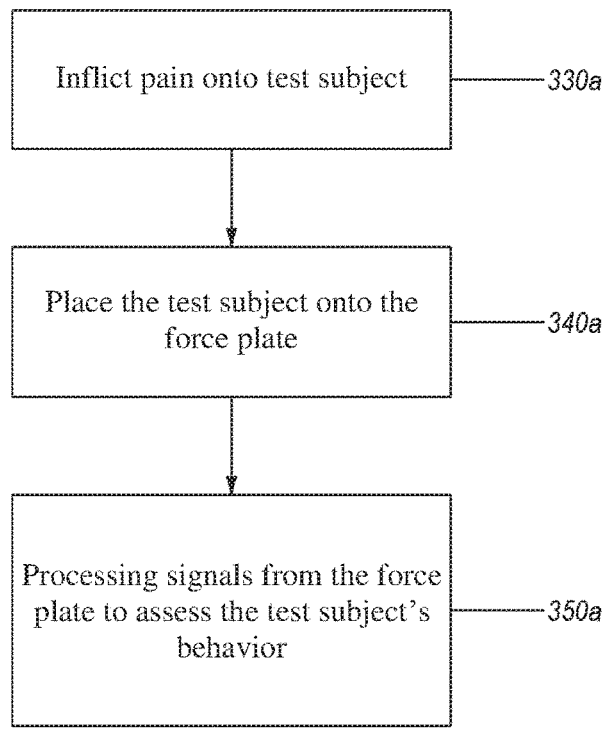
FIG. 5A illustrates a flowchart for performing a behavioral assessment of a modified test subject in accordance with another implementation of the present invention.
Figure 5B:
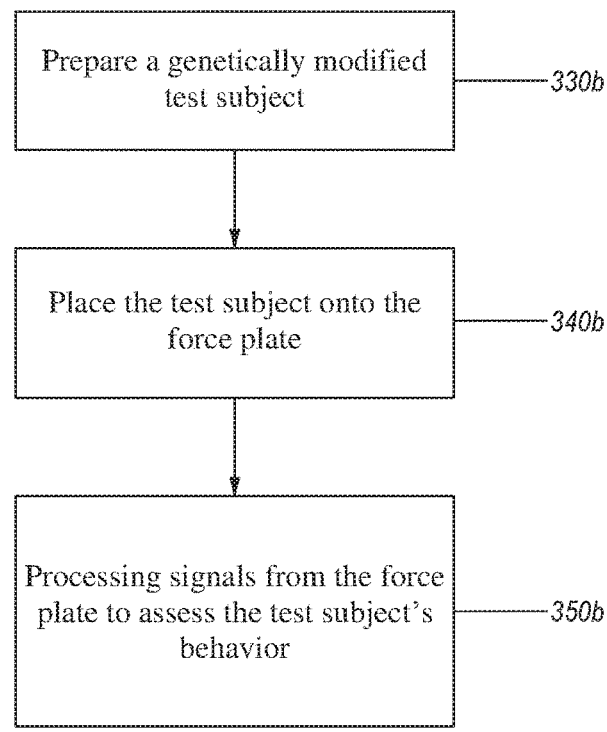
FIG. 5B illustrates a flowchart for performing a behavioral assessment of a genetically modified test subject in accordance with still another implementation of the present invention.
Figure 6A:
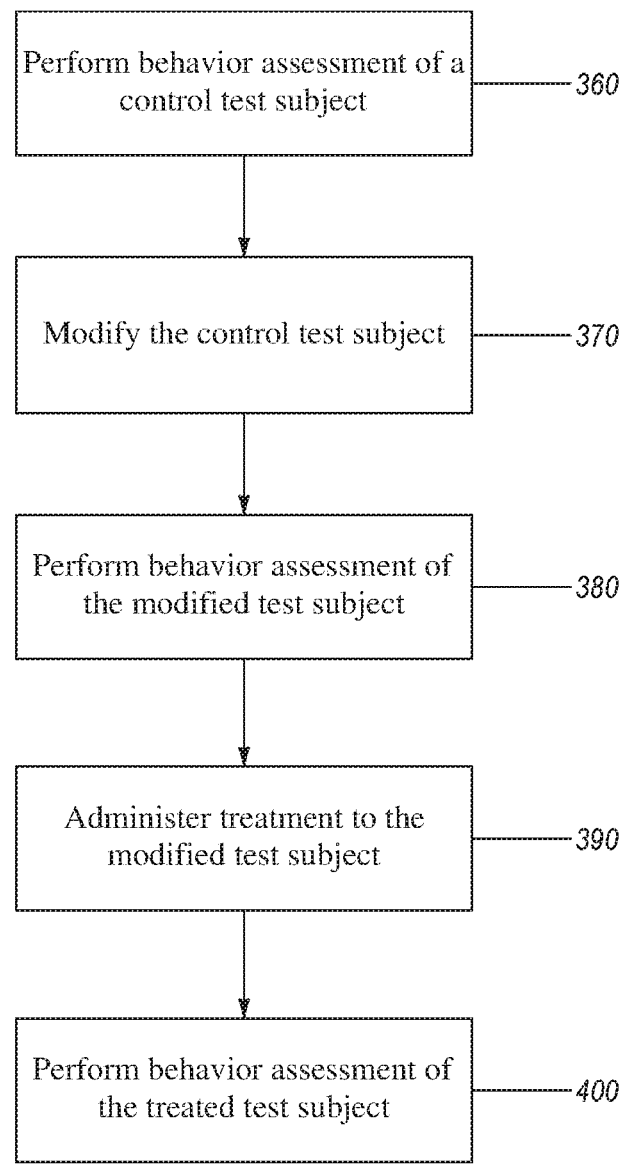
FIG. 6A illustrates a flowchart for performing a series of behavior assessments of one or more test subjects in accordance with one implementation of the present invention.
Figure 6B:
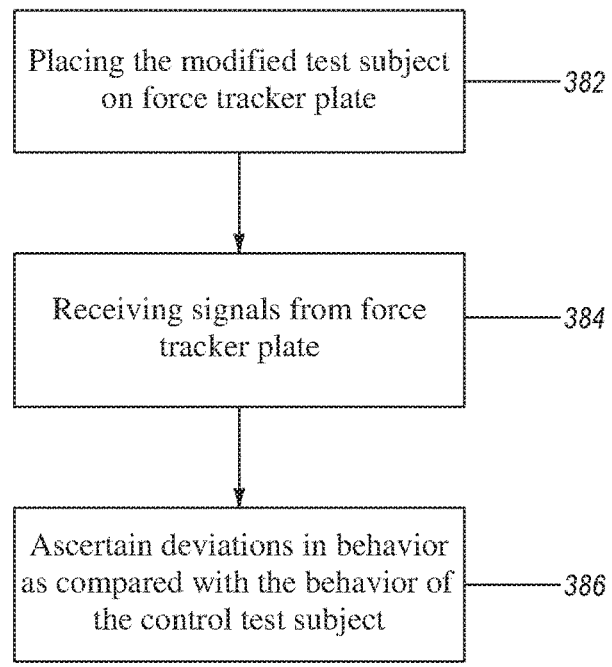
FIG. 6B illustrates a flowchart for performing a behavioral assessment of a modified test subject in accordance with another implementation of the present invention.
Figure 6C:
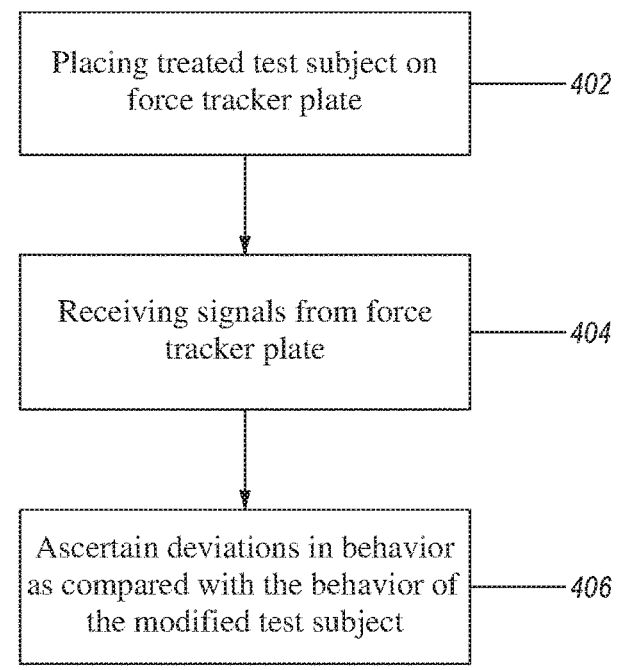
FIG. 6C illustrates a flowchart for performing a behavioral assessment of a treated test subject in accordance with another implementation of the present invention.

For example, as illustrated in FIGS. 5A, 5B, the test subject may be modified (e.g., by inflicting pain onto the test subject's leg (step 330a) or by producing a genetically modified test subject (step 330b)), as compared with a control test subject. Subsequently, the test subject can be placed onto the high resolution force module of the device for measuring behavioral aspects, to track the forces produced by the test subject's feet on the surface of the high resolution force module (steps 340a, 340b). In steps 350a, 350b, the controller can process signals from the high resolution force module (i.e., from the force sensors located thereon) to assess the test subject's behavior.

As described above, the device for measuring behavioral aspects can assess the change in the test subject's behavior as compared with the control test subject (which may be the same test subject or may be a different test subject that has generally the same characteristics as the former, other than a particular genetic or chemical modification). For instance, pain treatment efficacy can be assessed by observing changes in the test subject's behavior. FIGS. 5A-5C illustrate one or more embodiments of such procedure. Particularly, as shown in FIG. 5A, the behavior assessment of a test subject (e.g., a control test subject) can be performed in step 360, as described above. Subsequently, the control test subject can be modified in step 370. For example, the test subject may be injured or hurt (e.g., formaldehyde may be injected into the control test subject's test leg, to inflict pain thereon). Subsequently, behavior of the modified test subject also can be assessed in step 380, to determine the extent of the injury.

For instance, as illustrated in FIG. 5B, the modified test subject may be place onto the high resolution force module (step 382) and the controller can receive signals from the high resolution force module, while the modified test subject moves thereon (step 384). Thus, deviations in behavior of the modified test subject, as compared with the behavior of the control test subject, may be monitored and ascertained in step 386. More specifically, the duration of contact of the test leg with the surface of the high resolution force module during test subject's movement can be compared with the duration of contact of the same leg exhibited by the control test subject. Similarly, the duration of contact of the test leg with the surface of the high resolution force module can be compared with the duration of contact with other (unaffected) legs of the modified test subject.

Furthermore, other behavioral aspects of the modified test subject can be compared with the control test subject. For instance, the location and/or movement of the center of mass for the modified test subject can be compared with the control test subject (e.g., by monitoring the amount of force carried by each of the test subject's legs). Similarly, by monitoring the amount of force carried by each of the test subject's legs, the controller or researcher can detect whether the modified test subject favors one or more legs over others. Particularly, the researcher can detect whether the test subject is carrying less weight of the test leg.

Additionally, controller or the researcher can detect whether the test subject is dragging the test leg. For example, the test leg may not lose contact with the surface of the high resolution force module as the modified test subject moves thereon. Moreover, increased or decreased contact with the high resolution force module can indicate that the modified test subject is dragging the test leg on the surface of the high resolution module. For instance, the control test subject may activate three to six force sensors on the high resolution module as the control test subject moves thereon. By contrast, the modified test subject that is dragging its test leg on the surface of the high resolution module, can activate seven to ten force sensors, indicating a greater area of contact of the test leg with the surface of the high resolution module.

In some embodiments, as illustrated in FIG. 5A, the modified test subject may be treated and/or medicated in step 390. For instance, administered treatment may be aimed at counteracting effects of modifications made to the modified test subject. For example, the modified test subject can receive pain medicine to counteract the pain inflicted on the test subject in step 370. In another example, the test subject may receive treatment aimed at reducing or alleviating symptoms of a modified genetic condition. Subsequently, a behavioral assessment of the treated subject can be performed in step 400.

More specifically, as illustrated in FIG. 5C, the treated test subject can be placed on the high resolution force module (step 402) and signals from the high resolution force module can be received by the controller in step 404. Subsequently, behavior of the treated test subject can be compared with the behavior of the control test subject to determine deviations or changes in the behavior and/or to ascertain effectiveness of the administered treatment. Furthermore, treated test subject's behavior can be compared with the control test subject's behavior to determine whether the administered treatment allows the test subject to moved on the surface of the high resolution force module in the same manner as the test subject move before modification.

As described above, various aspect of the test subject's behavior can be ascertained and compared with previous data. Particularly, the amount of weight placed on the test leg, the duration of the test leg's contact with the high resolution force module, etc. It should be noted that other behavioral aspects can be compared between the separate behavioral assessments of the control, modified, and/or treated test subjects, which may include tremors (including individual foot tremors), distance traveled, velocity, bouts of low mobility, rotations, focused stereotypy, other behavioral aspects, and combinations thereof.

For example, rapid fluctuations in force applied to (and sensed by) the force sensors and/or groups of force sensors can be interpreted by the controller or researcher as a foot tremor in one or more legs of the test subject. As described above, the controller can detect movement of the test subject on the surface of the high resolution force module; thus, the controller can detect bouts of low mobility, rotations, and focused stereotypy of the test subject. Moreover, as noted above, the researcher may utilize numerous test subjects to determine effects of the modifications (such as genetic and/or chemical) as well as effects and effectiveness of treatments of the test subjects, which may affect and/or counteract the effects of the modifications.

Figure 7:
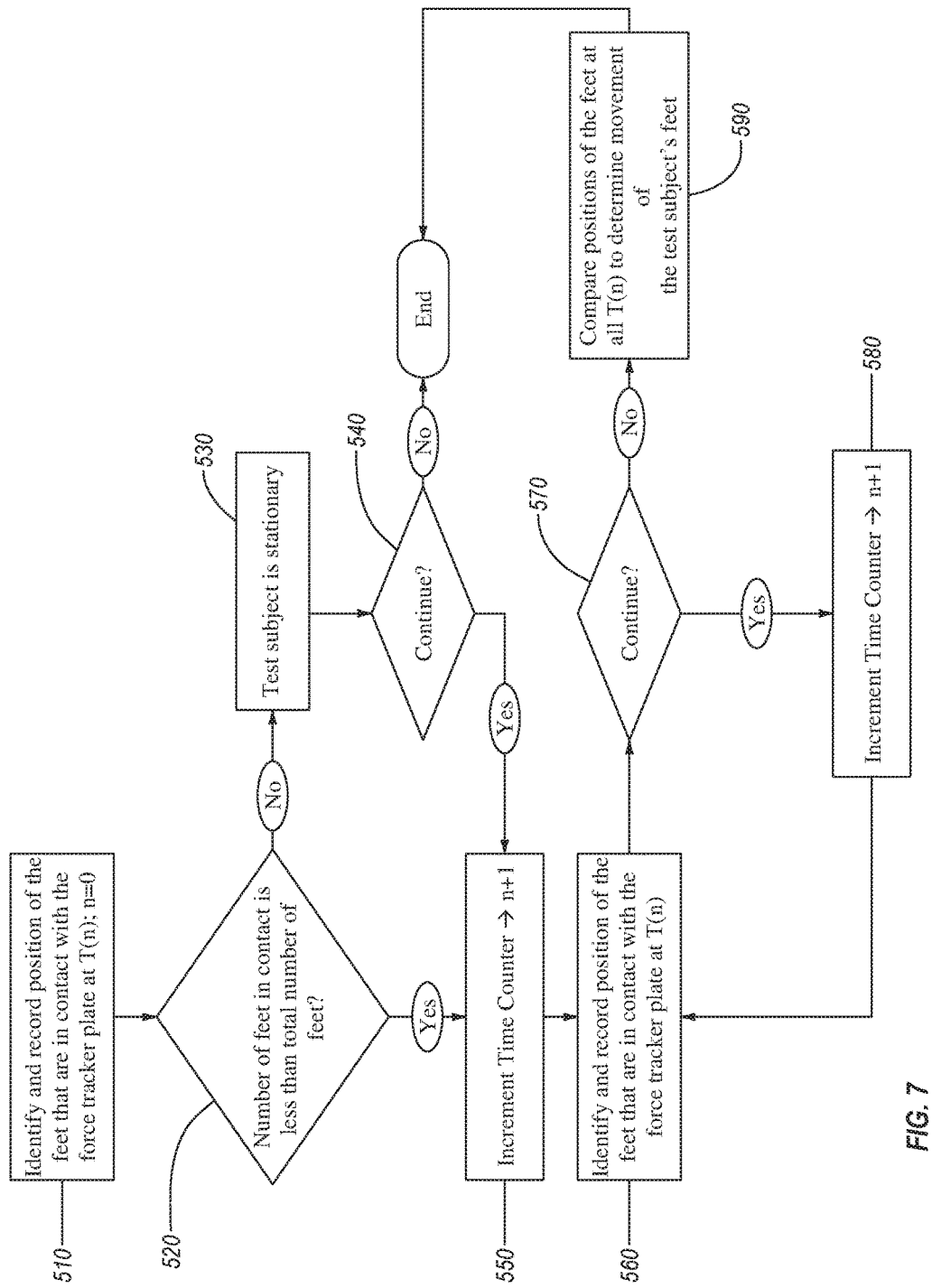
FIG. 7 illustrates a flowchart for performing a behavioral assessment of a test subject in accordance with one implementation of the present invention.

As described above, the controller can receive signals from the force sensors 130, which have appropriate sensitivities, and can determine the various aspects of the test subject's behavior on the surface of the high resolution force module 110. More specifically, as illustrated in an exemplary embodiment of FIG. 7, the controller can perform various steps or acts to determine the behavioral aspects (e.g., movements and/or lack thereof) of the test subject. For instance, in a step 510, the controller can identify and record position of the test subject's feet that are in contact with the high resolution force module 110 at a time frame T(n). In other words, the controller can record a particular frame, which may include information received and/or processed by the controller at the time frame T(n). Thus, the controller can obtain information (e.g., change in resistance of or current passing through the force sensors), thereby determining the amount of force applied to the force sensors 130. Additionally, as described above, the controller can obtain position information about the test subject's feet by associating the feet with the known locations of the active force sensors (FIG. 4A).

In some instances (e.g., when the test subject is placed on the surface of the high resolution force module 110), n can equal zero. Moreover, the increment n can be any unit of time, which may be suitable for performing the behavioral assessment. In other words, the controller can sample (take readings from) the force sensors 130 at a desired rate or frequency (frame rate), to obtain sufficient information for analyzing the test subject's movement. For instance, n may be in the range of 1 second to 0.1 seconds (i.e., 1 Hz to 10 Hz). In some embodiments, n may be less than 0.1 seconds; for example, n may be in one of the following ranges, between approximately 0.1 seconds to 0.01 seconds (i.e., 10 Hz to 100 Hz); 0.02 seconds to 0.001 seconds (i.e., 50 Hz to 1 kHz), and less than 0.001 seconds.

In some instances, the number of feet in contact with the high resolution force module 110 (as determined by the force sensors 130) may be the same as the total number of feet the test subject has, as determined at step 520. Thus, the test subject may be stationary at that particular time frame T(n), as indicated at a result step 530. In some instances, however, the subject may be rocking and/or commencing movement and, this, may have all of its feet in contact with the high resolution force module 110. It should be noted that the test subject may appear at rest or not moving during a particular frame, especially at high sampling rate. Accordingly, to achieve a more accurate representation of the test subject's behavior, the controller may continue sampling the force sensors, for example, by choosing to continue at a decision point 540.

Hence, in some embodiments, the controller may proceed to increment the time counter by 1 unit of time (i.e., n+1), at a step 550. As described above, the unit of time n may be any desired unit, which may provide sufficient sampling rate for performing the behavioral assessment of the test subject. Thus, the controller may continue to identify and record position of the test subject's feet (i.e., collecting force and position information for each foot at each time frame) that are in contact with the high resolution force module 110 at step 560. Moreover, the controller may collect additional data (i.e., signals from force sensors during additional time frames). Thus, at a decision point 570, the controller (or researcher) may choose to return to the step 560.

Hence, the controller may again increment the time counter by a unit of time (as described above) at a step 580. In some embodiments, the controller also may associate particular readings of signals received from the force sensors with particular time frames. Accordingly, in a step 590, the controller can compare positions of the feet at all time frames T(n), one to another, to determine movement of the test subject's feet. More specifically, by comparing positions of the test subject's feet across multiple time frames T(n), the controller can determine the test subject's movement during the behavioral assessment, which may include distance traveled, velocity, bouts of low mobility, rotations, focused stereotypy, other types of movement and combinations thereof. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A device for measuring the behavior of a test subject having two or more feet and having a first weight, the device comprising:
   a high resolution force module having a first surface, the first surface comprising:
      an array of force sensors each individual force sensor capable of sensing an individual force, each force sensor of the array of force sensors positioned within a predetermined distance from any adjacent force sensor of the array of force sensors;
      a rigid support module have a first surface, wherein the rigid support module comprises on or more vacuum ports configured to preload at least one of the array of force sensors;
      a flexible stack forming the first surface of the high resolution force modules, the flexible stack containing the array of force sensors, and the flexible stack being secured to the first surface of the rigid support module; and
   a control system in functional communication with the high resolution force module, the control system comprising a processor and physical memory, the control system containing instructions stored in the physical memory that when executed by the processor, cause the control system to perform the following acts:
      receiving a first signal from a first sensor of the array of force sensors corresponding to a first foot of the two or more feet and receiving a second signal for a second sensor of the array of force sensors corresponding to a second foot at a predetermined rate;
      determining a first amount of force applied by the first foot based on the first signal;
      determining a second amount of force applied by the second foot based on the second signal; and
      determining behavior of said test subject with respect to the first surface of the high resolution force module based on the first amount of force and the second amount of force.

2. The device of claim 1, wherein the act of determining the behavior of said test subject comprises determining movement, position, position of one or more feet, force exerted by one or more feet, a tremor in a single foot, or a combination thereof for said test subject.

3. The device of claim 2, wherein determining movement comprises determining one or more of the test subject's distance traveled, velocity, bouts of low mobility, rotations, and focused stereotypy.

4. The device of claim 2, wherein determining movement, position, position of one or more feet, force exerted by one or more feet, a tremor in a single foot, or a combination thereof for said test subject with respect to the first surface of the high resolution force module comprises associating the received first or second signal with a specific location of one or more force sensors of the array of force sensors.

5. The device of claim 1, wherein the array of force sensors are arranged in a plurality of rows and columns having equidistant spacing one from another.

6. The device of claim 5, wherein the equidistant spacing is 2 mm.

7. The device of claim 1, wherein the predetermined distance of each of the force sensors from any adjacent force sensor of the array of force sensors is 1 mm.

8. The device of claim 1, wherein the first amount of force is 5 grams.

9. The device of claim 1, wherein the first amount of force is 1 gram.

10. The device of claim 1, wherein the predetermined rate is between approximately 10 Hz and 100 Hz.

11. The device of claim 1, further comprising receiving signals from the array of force sensors at predetermined time intervals.

12. The device of claim 11, wherein the predetermined time intervals are in the range between 0.001 seconds and 0.1 seconds.

13. A method of measuring behavior of a test subject having two or more feet and having a first weight, the method comprising:
   placing said test subject on a surface of a high resolution force module, the surface of the high resolution force module including:
      an array of force sensors, wherein each individual force sensor of the array of force sensors is capable of sensing individual forces, wherein each force sensor of the array of force sensors;
      a rigid support module have a first surface, wherein the rigid support module comprises one or more vacuum ports configured to preload at least one of the array of force sensors; and
      a flexible stack forming the first surface of the high resolution force modules, the flexible stack containing the array of force sensors, and the flexible stack being secured to the first surface of the rigid support module;
   preloading at least one of the array of force sensors using the one or more vacuum ports;
   receiving a first signal from a first force sensor of the array of force sensors corresponding to a first foot of the two or more feet and receiving a second signal for a second sensor of the array of forces sensors corresponding to a second foot;
   determining a first amount of force applied by the first foot based on the first signal at a first time;
   determining a second amount of force applied by the first foot based on the second signal at a second time; and
   processing the received first signal and a second signal from the array of force sensors to determine behavior of said test subject with respect to the surface of the high resolution force module based on the first amount of force and the second amount of force.

14. The method of claim 13, wherein processing the received first signal and second signal from the array of force sensors to determine behavior of said test subject comprises processing the received signals from the array of force sensors to determine force exerted by a first foot, a tremor in a single foot, or a combination thereof for said test subject.

15. The method of claim 13, wherein processing the received signals from the array of force sensors to determine behavior of said test subject comprises processing the received signals from the array of force sensors to determine position of one or more feet comprises determining position of all feet of said test subject at a time of the received signals from the array of force sensors.

16. The method of claim 13, wherein receiving signals from the array of force sensors is performed at predetermined time intervals.

17. The method of claim 16, wherein the predetermined time intervals are in the range between 0.001 seconds and 0.1 seconds.

18. A method of performing a behavioral assessment of a test subject having multiple legs and weighing less than 5 kg, the method comprising:
administering a first behavioral assessment of said test subject, comprising:
placing said test subject on a surface of a high resolution force module, the surface of the high resolution force module including:
an array of force sensors wherein each individual force sensor of the array of force sensors is capable of sensing an individual force, each force sensor of the array of force sensors is positioned within a predetermined distance from any adjacent force sensor of the array of force sensors;
a rigid support module have a first surface, wherein the rigid support module comprises one or more vacuum ports configured to preload at least one of the array of force sensors; and
a flexible stack forming the first surface of the high resolution force modules, the flexible stack containing the array of force sensors, and the flexible stack being secured to the first surface of the rigid support module;
preloading at least one of the array of force sensors using the one or more vacuum ports; and
obtaining force and location information from the array of force sensors; and
measuring behavior of the test subject by processing the obtained force and location information.

19. The method of claim 18, wherein measuring the behavior of the test subject comprises determining the test subject's movement, gait, position, position of one or more feet, force exerted by one or more feet, a tremor in a single foot, or a combination thereof.

20. The method of claim 19, wherein determining the test subject's movement comprises determining one or more of the test subject's distance traveled, velocity, bouts of low mobility, rotations, and focused stereotypy.

21. The method of claim 19, wherein said test subject has predetermined genetic or chemical modifications.

22. The method of claim 21, further comprising administering medication to said test subject to counteract effects of the predetermined genetic or chemical modifications.

23. The method of claim 22, the method further comprising administering a second behavioral assessment to determine effectiveness of the administered medication.

24. The method of claim 21, the method further comprising monitoring changes in said test subject's motor behavior by administering a second behavioral assessment of said test subject at a time subsequent to a time of administering the first behavioral assessment of said test subject.

25. The method of claim 18, further comprising:
implanting chronic electrodes into said test subjects brain;
connecting the chronic electrodes to a head stage; and
obtaining readings from the chronic electrodes.

26. The method of claim 25, further comprising correlating the readings from the chronic electrodes with the test subject's movement, gait, position, position of one or more feet, force exerted by one or more feet, tremors, or a combination thereof.

27. The method of claim 26, wherein correlating the readings from the chronic electrodes with the test subject's movement, gait, position, position of one or more feet, force exerted by one or more feet, tremors, or a combination thereof comprises correlating neuron activity in said subject's brain with the test subject's movement, gait, position, position of one or more feet, force exerted by one or more feet, a tremor in a single foot, or a combination thereof.

28. A system for measuring behavior of a test subject having two or more feet and having a first weight, the system comprising:
a plurality of high resolution force modules each having a first surface, the first surface comprising:
an array of force sensors each individual force sensor capable of sensing an individual force, each force sensor of the array of force sensors positioned within a predetermined distance from any adjacent force sensor of the array of force sensors;
a rigid support module have a first surface, wherein the rigid support module comprises on or more vacuum ports configured to preload at least one of the array of force sensors;
a flexible stack forming the first surface of the high resolution force modules, the flexible stack containing the array of force sensors, and the flexible stack being secured to the first surface of the rigid support module; and
a control system in functional communication with the high resolution force module, the control system comprising a processor and physical memory, the control system containing instructions stored in the physical memory that when executed by the processor, cause the control system to perform the following acts:
receiving a first signal from a first sensor of the array of force sensors corresponding to a first foot of the two or more feet and receiving a second signal from the array of force sensors corresponding to a second foot at a predetermined rate;
determining a first amount of force applied by the first foot based on the first signal;
determining a second amount of force applied by the first foot based on the second signal; and
determining behavior of said test subject with respect to the first surface of the high resolution force module based on the first amount of force and the second amount of force.

29. The system of claim 28, wherein each high resolution force module of the plurality of high resolution force modules is in functional communication with the control system.

30. The system of claim 28, wherein the plurality of high resolution force modules form a T-shaped test area.

31. The system of claim 28, wherein the plurality of high resolution force modules form a radial maze test area.

\* \* \* \* \*